(12) United States Patent
Reimer et al.

(10) Patent No.: US 9,879,783 B1
(45) Date of Patent: *Jan. 30, 2018

(54) OUTER SEAL

(71) Applicant: Engineered Seal Products, Inc., Cedar Rapids, IA (US)

(72) Inventors: Mark Reimer, Coralville, IA (US); Dale Schumann, Cedar Rapids, IA (US); Jay Bonefas, Cedar Rapids, IA (US); Matt Banowetz, Cedar Rapids, IA (US)

(73) Assignee: Engineered Seal Products, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/830,084

(22) Filed: Aug. 19, 2015

Related U.S. Application Data

(63) Continuation of application No. 13/955,561, filed on Jul. 31, 2013, now Pat. No. 9,140,365.

(60) Provisional application No. 61/699,330, filed on Sep. 11, 2012.

(51) Int. Cl.
*F16J 15/00* (2006.01)
*F16J 15/3232* (2016.01)
*E02F 9/00* (2006.01)

(52) U.S. Cl.
CPC ........... *F16J 15/3232* (2013.01); *E02F 9/006* (2013.01)

(58) Field of Classification Search
CPC ...... F16J 15/168; F16J 15/3232; F02K 1/805; D06B 23/18; C23C 15/562; G01D 5/34769; E02F 9/006

USPC .......................................................... 277/345
See application file for complete search history.

(56) References Cited

U.S. PATENT DOCUMENTS

| | | | |
|---|---|---|---|
| 4,190,378 A | 2/1980 | Stecklein | |
| 4,210,405 A | 7/1980 | Jesswein | |
| 4,361,335 A | 11/1982 | Vinciguerra | |
| 4,417,735 A | 11/1983 | Heisler | |
| 4,991,858 A | 2/1991 | Abila et al. | |
| 5,662,340 A * | 9/1997 | Bessette | F16J 15/3488 277/374 |
| 7,594,664 B2 * | 9/2009 | Maskaliunas | 277/551 |
| 7,909,333 B2 * | 3/2011 | Greca | F16J 15/3264 277/349 |
| 8,231,129 B2 * | 7/2012 | Kobayashi | F16C 33/7876 277/346 |
| 2001/0027818 A1 * | 10/2001 | Hegler | F16L 21/035 138/109 |

(Continued)

FOREIGN PATENT DOCUMENTS

| | | |
|---|---|---|
| JP | 54182766 | 6/1978 |
| JP | 5947767 | 3/1984 |

OTHER PUBLICATIONS

International Search Report dated Oct. 2, 2008 from related International Application No. PCT/us2008/05411.

(Continued)

*Primary Examiner* — Nathan Cumar
(74) *Attorney, Agent, or Firm* — Shuttleworth & Ingersoll, PLC; Jason Sytsma (57) ABSTRACT

Disclosed is a seal comprising a first sealing surface with a first lip at a terminus of the first sealing surface and a second lip spaced axially apart from the first lip. A third lip is spaced radially apart from the second lip flexes away from the third lip when the seal is installed.

18 Claims, 6 Drawing Sheets

(56) References Cited

U.S. PATENT DOCUMENTS

2004/0079032 A1    4/2004  Russell et al.
2007/0222161 A1*   9/2007  Voydatch ............. F16J 15/3264
                                                            277/551

OTHER PUBLICATIONS

Klousia, et al.—U.S. Appl. No. 12/597,811, filed Oct. 27, 2009 (Publication No. US 2012/0286477).
Klousia, et al.—International Application No. PCT/US2008/005411 filed Apr. 25, 2008 (International Publication No. WO 2009/008941.

* cited by examiner

OUTER SEAL

This application is a continuation of U.S. application Ser. No. 13/955,561 filed Jul. 31, 2013 which claims priority to U.S. Provisional Pat. App. No. 61/699,330 filed Sep. 11, 2012, which are incorporated by reference herein. This application also incorporates by reference the contents of U.S. Pat. Pub. No. 2012/0286477.

BACKGROUND

Pivot joints used in the linkages of work vehicles, such as, for example, loader backhoes and four wheel drive loaders include pins and bushings to allow relative rotation between connected parts. These pivot joints conventionally include seals between the pins and the bushings as barriers to debris. However, due to the harsh environments in which these vehicles are used, i.e., an environment having significant amounts of dirt and debris, dirt and debris tends to get past these barriers and cause accelerated wear of the pivot joints.

Some manufacturers of work vehicles have sought to remedy the difficulties outlined above by forming pre-barriers, i.e., a first line of defense against debris, via o-rings located between outer surfaces of the connected portions of linkages and work tools; however, this approach has led to at least the following two difficulties: (1) the o-rings are typically round, allowing dirt and debris to eventually work past the o-ring and into the space between the pins and bushings; and (2) the o-rings wear and their eventual replacement requires disconnection of the rotationally connected parts, a substantial expense with respect to time and money.

SUMMARY

A seal is disclosed with a first sealing surface with a first lip at a terminus of the first sealing surface and a second lip spaced axially apart from the first lip. A third lip is spaced radially apart from the second lip flexes away from the third lip when the seal is installed. The second lip has a terminus and the third lip has a terminus spaced axially apart from the second lip when the seal is in a rest position and in line with respect to a radial direction when the seal is installed.

The seal can be used in a machine with a pivot joint having a first member with a chamfered face and a second member having a side wall and combined with the first member and a portion of which is separated therefrom by a gap between the first member and the second member. The seal is positioned partially in the gap to seal the gap from external debris.

DESCRIPTION OF THE ILLUSTRATED EMBODIMENT

Figure 1:
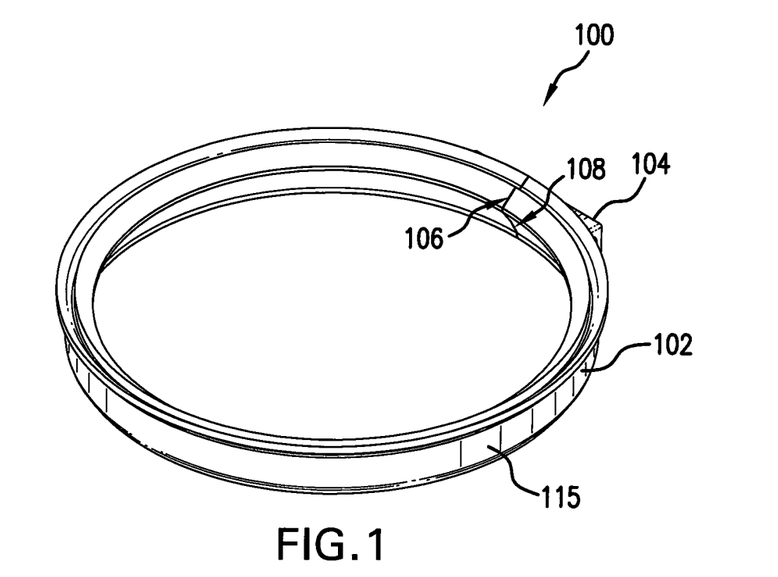
FIG. 1 is a perspective view of an outer seal.
Figure 2:
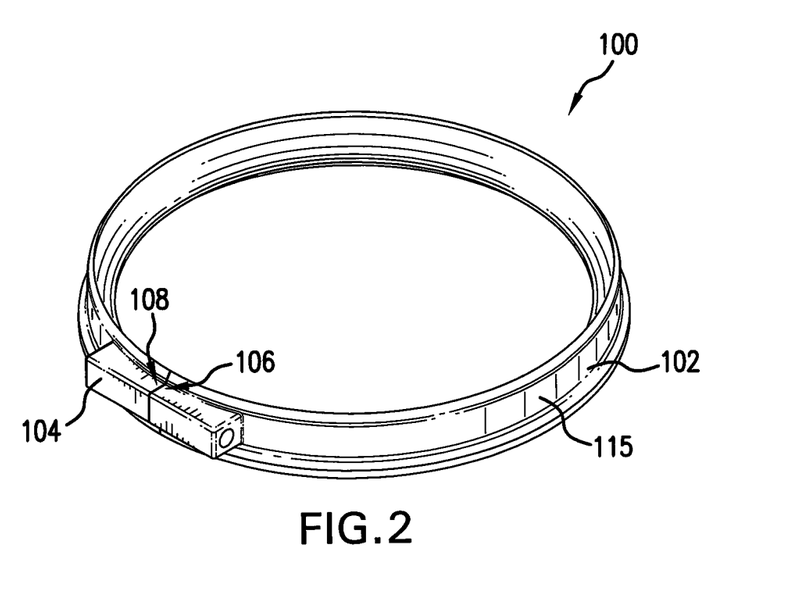
FIG. 2 is another perspective view of the outer seal of FIG. 1.
Figure 3:
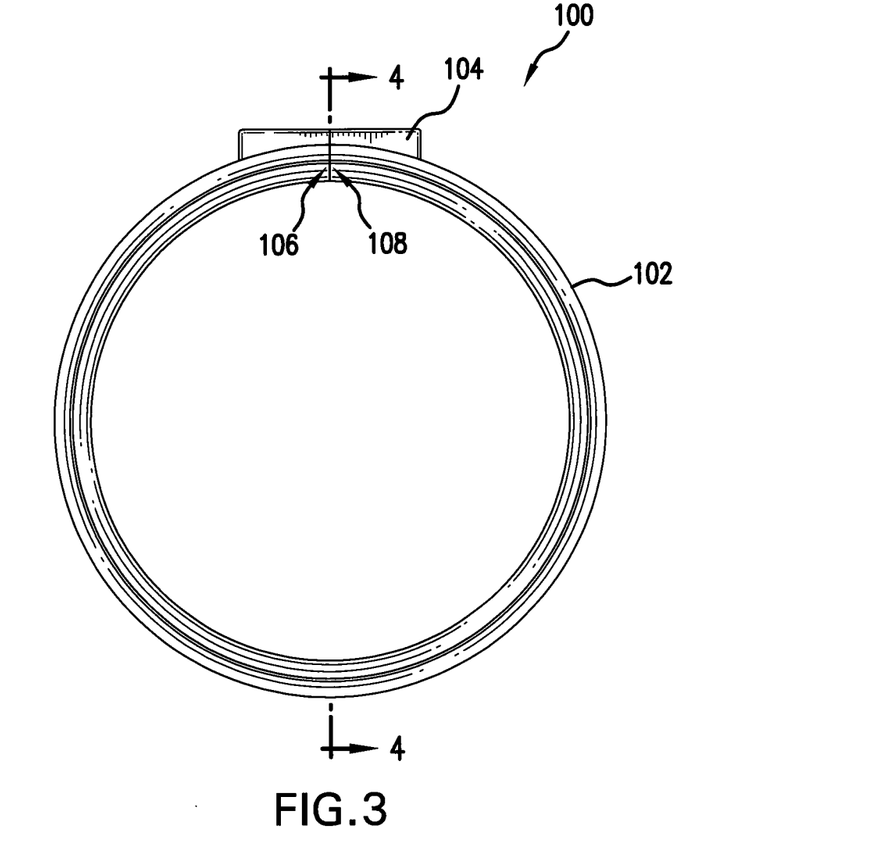
FIG. 3 is a top view of the outer seal of FIG. 1.

FIG. 1 shows an outer seal 100. Seal 100 is defined by an outer surface 115 forming an outer diameter around a longitudinal axis. Throughout this specification reference will be made to axial direction, which refers to a direction parallel with the longitudinal axis, and a radial direction, which refers to a direction perpendicular to the longitudinal axis. Seal 100 includes a first portion 102 and can include a second portion 104. In an embodiment with second portion 104, second portion 104 is positioned along an arc of the outer diameter of seal 100, and can be integral with first portion 102. In such an embodiment, seal 100 is split on a plane parallel to the longitudinal axis to form a first end 106 and a second end 108, which can selectively be joined together at second portion 104 by a fastener. In an alternative embodiment, seal 100 is not split, and therefore, does not include second portion 104.

Figure 4:
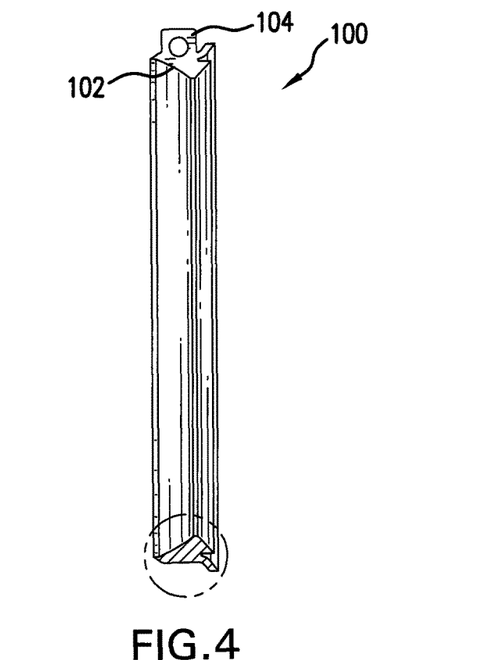
FIG. 4 is a cross-sectional view of the outer seal taken along the line 4-4 in FIG. 3.
Figure 4A:
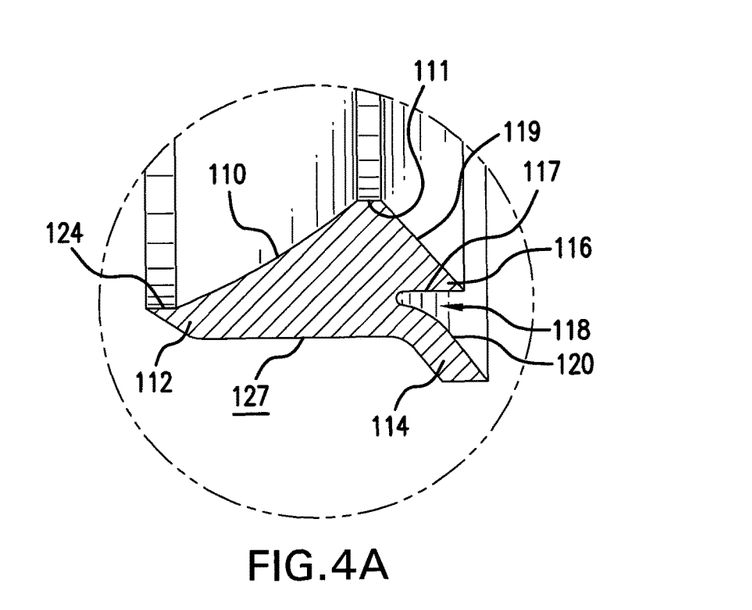
FIG. 4A is a close up view of the profile of the outer seal of FIG. 4.

FIG. 4 shows a cross-sectional view of seal 100 and FIG. 4A shows a close-up view of the profile of first portion 102 of seal 100 in a rest position. First portion 100 is generally wedge-shaped with a first sealing surface 110 terminating at a first lip 112. A second lip 114 spaced axially apart from first lip 112 functions as a primary seal. A top outer-surface 115 of seal 100 separates first lip 112 from second lip 114. A third lip 116 spaced radially apart and beneath second lip 114 functions as a secondary seal. Third lip 116 has a top surface 117 that is generally parallel with top outer-surface 115 of seal 100 and an inner surface 119 positioned at an acute angle with respect to top surface 117, both of which come together at a vertex to form the tip of third lip 116.

Second lip 114 is designed to flex away from third lip 116 when it is installed. A gap 118 separates second lip 114 from third lip 116 to enable second lip 114 to flex independently of third lip 116. Gap 118 is bounded by top surface of third lip 116 and a convex curve 120 on second lip 114. Convex curve 120 on second lip 114 improves the flexibility of second lip 114.

Figure 6:
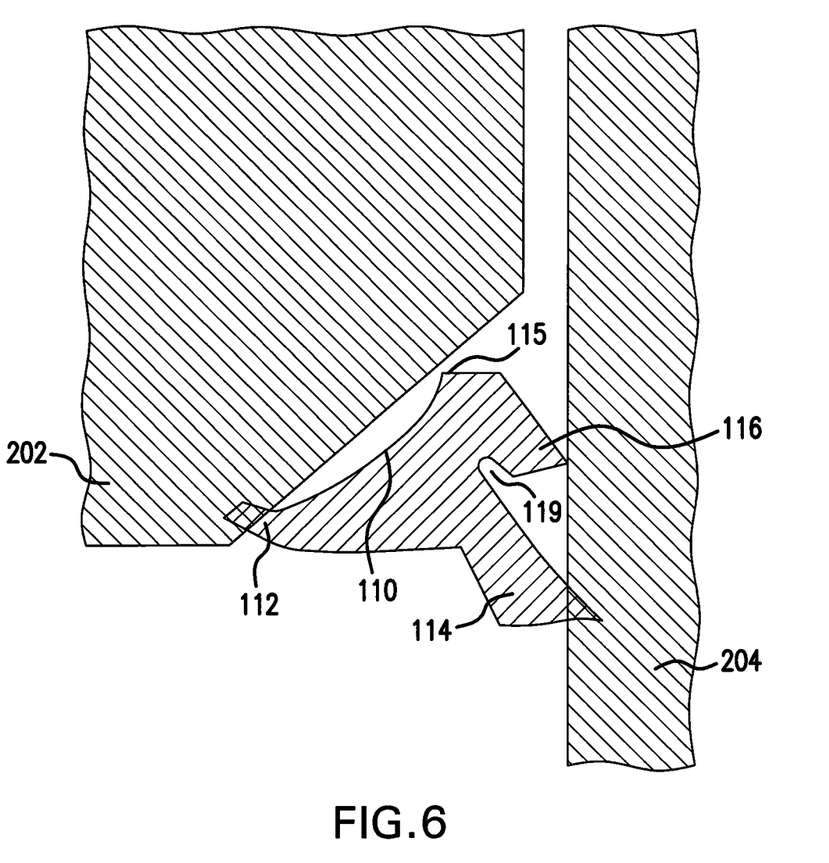
FIG. 6 is a close up view of the profile of an alternative embodiment of an outer seal as installed.

In an alternative embodiment, shown in FIG. 6, second lip 114 is undercut to flex away from third lip 116 when it is installed. An undercut gap 119 separates second lip 114 from third lip 116 to enable second lip 114 to flex independently of third lip 116. The shape of gap 118 or gap 119 can be varied to change the flexibility and compliance of second lip 114 and third lip 116 or to add manufacturing or installation efficiencies.

Figure 5A:
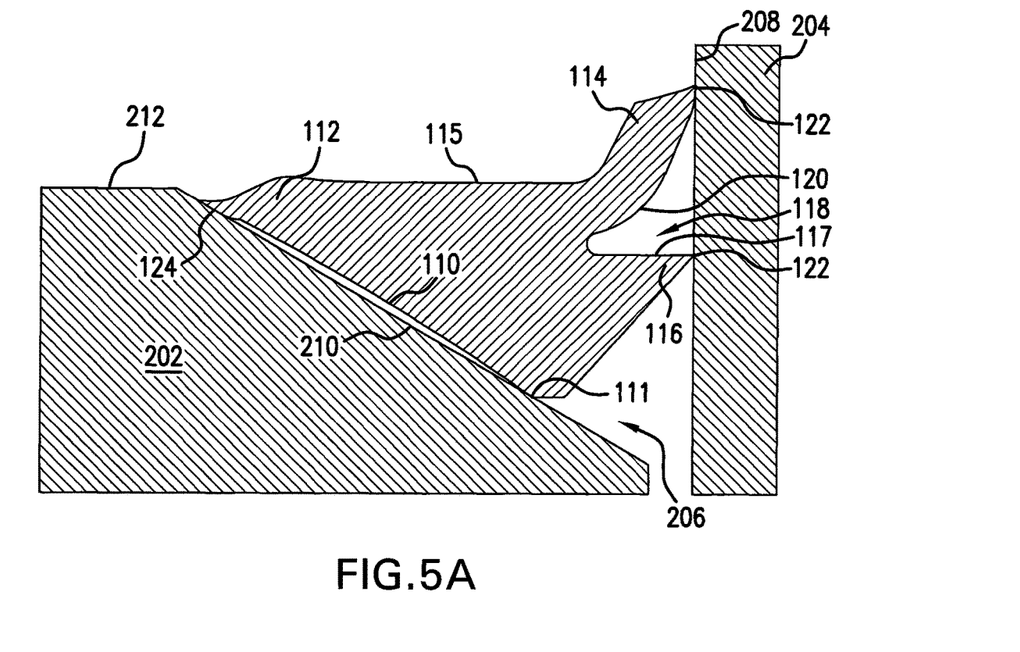
FIG. 5A is a close up view of the profile of the outer seal of FIG. 4 as installed.

FIG. 5A shows seal 100 placed around a gap 206 over a connecting linkage between a first member 202 and a second member 204. Connecting linkage can, for example, be a pivot joint with a greaseless bushing. Greaseless style bushings require many levels of sealing to ensure bushing life. Seal 100 can form an exterior seal over gap 206 of the pivot joint to keep out dirt and abrasives in extreme environmental operating conditions.

Figure 5B:
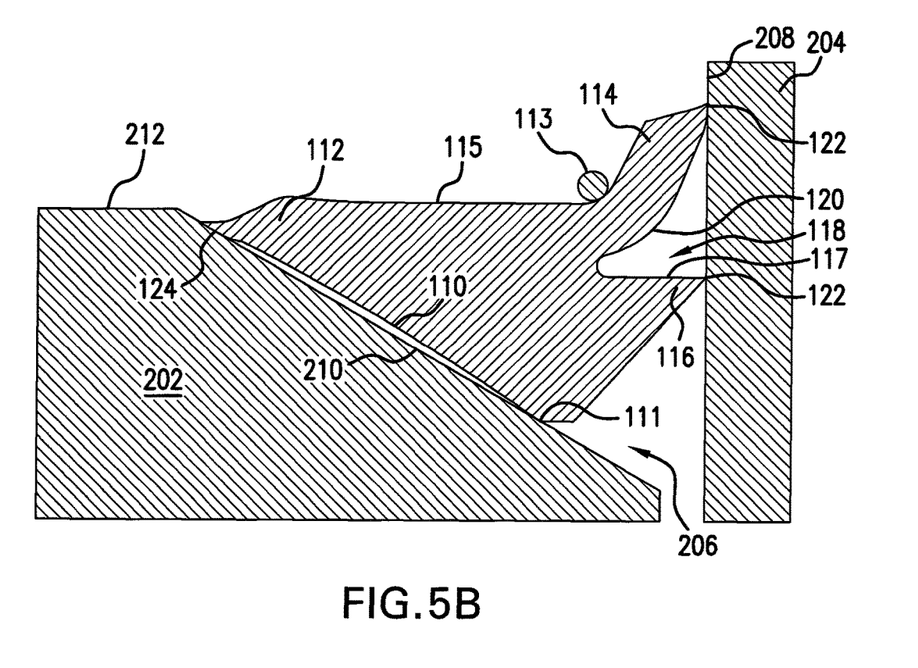
FIG. 5B is a close up view of a profile of an alternative embodiment of an outer seal as installed.

Seal 100 adjusts to seal gaps of considerable range without falling into connecting linkages during operation of a machine. In this regard, seal 100 can be constructed of any material of suitable flexibility and durability to allow seal 100 to be installed and removed without the need to undue the connecting linkages. FIG. 5B shows the embodiment of seal 100 that is not split where seal 100 can include a spring 113 around its outer circumference to hold seal 100 in position.

When seal 100 is installed, second lip 114 flexes upward shortening the axial width of seal 100 and bringing third lip 116 toward second member 204. Either upon installation or after a few hours of use, third lip 116 engages second member 204. Each second lip 114 and third lip 116 has a tip that engages a side wall 208 of second member 204 at contacting points 121 and 122, respectively. These contacting points 121 and 122 keep dust and debris out of gap 206. When second lip 114 (i.e. the primary seal) fails, third lip 116 (i.e. the secondary seal) functions as a backup. Third lip 116 also functions to take the load off of second lip 114. Rather than the force being applied solely to second lip 114, the force is distributed across third lip 116. Distributing the force across two lips, second lip 114 and third lip 116, increases the useful life of the primary, second lip 114 and creates a better seal.

On the stationary side of the linkage, gap 206 is sealed by first sealing surface 110 defined by first lip 112 and a fourth lip 111 that each engage a chamfered face 210 of first member 202. First lip 112 is hooked at its end with a second sealing surface 124 at an obtuse angle with respect to first sealing surface 110 and engages chamfered face 210 of first member 202 to keep debris out of gap 206. Fourth lip 111 functions as a backup to first lip 112. First sealing surface 110 has a concave profile to provide flexibility to first lip 112 and fourth lip 111.

Seal 100 is dinstguishable over prior art seals in several respects. Seal 100 has a second lip 114 that is designed to flex or distort to decrease the axial width of seal 100 so seal 100 conforms to the general dimensions of gap 206 between first member 202 and second member 204. Seal 100 also has a first lip 112 with a curved end to keep debris out of sealing surface 124.

To those skilled in the art to which this invention relates, many changes in construction and widely differing embodiments and applications of the invention will suggest themselves without departing from the spirit and scope of the invention; for example, one skilled in the art would recognize that more lips can be added to provide additional protection. The disclosures and the descriptions herein are purely illustrative and are not intended to be in any sense limiting. Various aspects of the different embodiments can be combined in different combinations to create new embodiments within the scope of the invention.

What is claimed is:

1. A seal comprising:
    a generally wedge-shaped cross section formed by a first sealing surface and an outer surface meeting at a first lip at a terminus of the first sealing surface;
    a second lip spaced axially apart from the first lip;
    a third lip spaced axially apart from the first sealing surface and radially apart from the second lip, wherein in an installed position the second lip is flexed away from the third lip and toward the first lip; and
    a fourth lip spaced at the other terminus of the first sealing surface, wherein the first lip and the fourth lip and the first sealing surface between the first lip and the fourth lip are formed of a single piece of material, wherein the third lip is positioned radially between the second lip and the fourth lip.

2. The seal of claim 1, wherein the second lip further comprises a convex curve.

3. The seal of claim 1, wherein the second lip has a terminus and the third lip has a terminus, wherein the terminus of the third lip is spaced axially apart from the second lip when the seal is in a rest position and in line with respect to a radial direction when the seal is installed.

4. The seal of claim 3, wherein the seal has an outer surface defining an outer diameter around a longitudinal axis, and the seal further comprises a second portion integral with the outer surface and along an arc of the outer diameter and split in a plane parallel to the longitudinal axis to form two ends; and a fastener to selectively hold the two ends together.

5. The seal of claim 3, further comprises a spring around an outer circumference of the seal.

6. The seal of claim 1, wherein the first lip has a rest position at an angle with respect to a second sealing surface and an installed position engaged with the second sealing surface.

7. The seal of claim 6, wherein the angle is an obtuse angle.

8. The seal of claim 1, wherein the third lip has a top surface and the seal further comprises a top outer-surface, wherein the top surface of the third lip is concentric with the top outer-surface of the seal.

9. A machine comprising:
    a pivot joint including a first member with a chamfered face and a second member including a side wall and combined with the first member and a portion of which is separated therefrom by a gap between the first member and the second member;
    a seal positioned partially in the gap to seal the gap from external debris, the seal including a first sealing surface engaged with the chamfered face of the first member, a first lip at a terminus of the first sealing surface, a second lip spaced axially apart from the first lip and engaged with the side wall of the second member, and a third lip spaced radially apart from the second lip and engaged with the side wall of the second member, wherein the second lip is flexed away from the third lip and toward the first lip with respect to a rest position, wherein the first lip and the first sealing surface are formed of a single piece of material; and wherein the second lip of the seal has a terminus and the third lip has a terminus, wherein the terminus of the third lip is spaced axially apart from the second lip when the seal is in the rest position and in line with respect to a radial direction when the seal is installed in the machine.

10. The machine of claim 9, wherein the first lip has a rest position at an angle with respect to a second sealing surface and an installed position engaged with the second sealing surface.

11. The machine of claim 9, wherein the second lip of the seal further comprises a convex curve.

12. The machine of claim 9, wherein the seal has an outer surface that defines an outer diameter around a longitudinal axis, and the seal further comprises a second portion integral with the outer surface and along an arc of the outer diameter and split in a plane parallel to the longitudinal axis to form two ends; and a fastener to selectively hold the two ends together.

13. The machine of claim 12, wherein the seal is formed entirely of a flexible material so that the seal can be separated and reconnected at the two ends.

14. The machine of claim 9, wherein the second sealing surface of the seal is at an obtuse angle with respect to the first sealing surface.

15. The machine of claim 9, wherein the third lip has a top surface and the seal further comprises a top outer-surface, wherein the top surface of the third lip is concentric with the top outer-surface of the seal.

16. The seal of claim 1, wherein the second lip and the third lip are formed of a single piece of material.

17. The seal of claim 16, wherein the first lip and the second lip and the third lip and the fourth lip are formed of the single piece of material.

18. The machine of claim 9, wherein the first member and the second member are axially separated.

\* \* \* \* \*